US012060985B1

(12) United States Patent
Chen

(10) Patent No.: US 12,060,985 B1
(45) Date of Patent: Aug. 13, 2024

(54) BENDABLE SUPPORT FOR LED NEON LAMPS

(71) Applicant: Sikai Chen, Delran, NJ (US)

(72) Inventor: Sikai Chen, Delran, NJ (US)

( * ) Notice: Subject to any disclaimer, the term of this patent is extended or adjusted under 35 U.S.C. 154(b) by 0 days.

(21) Appl. No.: 18/419,803

(22) Filed: Jan. 23, 2024

(51) Int. Cl.
*F21V 21/26* (2006.01)
*F21V 21/108* (2006.01)

(52) U.S. Cl.
CPC ............ *F21V 21/26* (2013.01); *F21V 21/108* (2013.01)

(58) Field of Classification Search
CPC ............................... F21V 21/26; F21V 21/108
See application file for complete search history.

(56) References Cited

U.S. PATENT DOCUMENTS 10,520,143 B1 * 12/2019 Findlay ................... F21V 31/04
11,635,177 B1 * 4/2023 Kay ........................ F21S 8/026 362/235
2021/0239280 A1 * 8/2021 Monestier ............... F21S 43/15

* cited by examiner

*Primary Examiner* — Anne M Hines
(74) *Attorney, Agent, or Firm* — Smart M. Goldstein

(57) ABSTRACT

A support for LED neon lamps consists of a straight, elongated, malleable metal, e.g. aluminum, channel. The channel has a bottom member extending the length of the channel, and a plurality of adjacently aligned side wall members. A slotted opening is located between each of the wall members, which are each interconnected by a thin bridge section located above each of the slotted openings. By this design, the channel is capable of being bent at at least one of the plurality of slotted openings. The channel's structural integrity remains in tact, regardless of how it is bent after the bridge section is cut. An elongated lamp which is mounted within the channel, bends along with the channel at the bended slotted opening or openings, beneath the severed bridge section or sections.

7 Claims, 5 Drawing Sheets

BENDABLE SUPPORT FOR LED NEON LAMPS

FIELD OF THE INVENTION

The present invention relates to LED neon lamp supports, specifically supports that allow for the bendable and flexible mounting of LED neon lamps.

BACKGROUND OF THE INVENTION

Traditional supports used for mounting LED neon lamps are generally u-shaped, but in order to maintain the structural integrity of the support, they are rigid and fixed in a single shape. This does not allow the supports to be flexed or bent into different configurations. Some flexible lamp mounting options exist, but these are often too soft for practical outdoor installation; thus presenting difficulties in maintaining the structural integrity and desired shape of the support and the lamps which are secured to the support.

SUMMARY OF THE INVENTION

It is thus the object of the present invention to provide a support for LED neon lamps which is both bendable to a desired design shape and shape-retaining. This is achieved through a unique design which incorporates strategically placed bridge sections interconnecting side wall members separated by slotted openings in a channel to allow for flexibility while maintaining overall structural integrity of the support.

These and other objects are accomplished by the present invention, a unique support for LED neon lamps which comprises a straight, elongated, malleable metal, e.g. aluminum, channel. The channel has a bottom member extending the length of the channel and a plurality of adjacently aligned side wall members. A slotted opening is located between each of the wall members which are each interconnected by a thin bridge section located above each of the slotted openings. By this design, when at least one of the bridge sections are severed, the channel is capable of being bent at at least one of the plurality of slotted openings. The channel's structural integrity remains in tact, regardless of how it is bent after the bridge section is cut. An elongated lamp which is mounted within the channel bends along with the channel at the bended slotted opening or openings, beneath the severed bridge section or sections.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
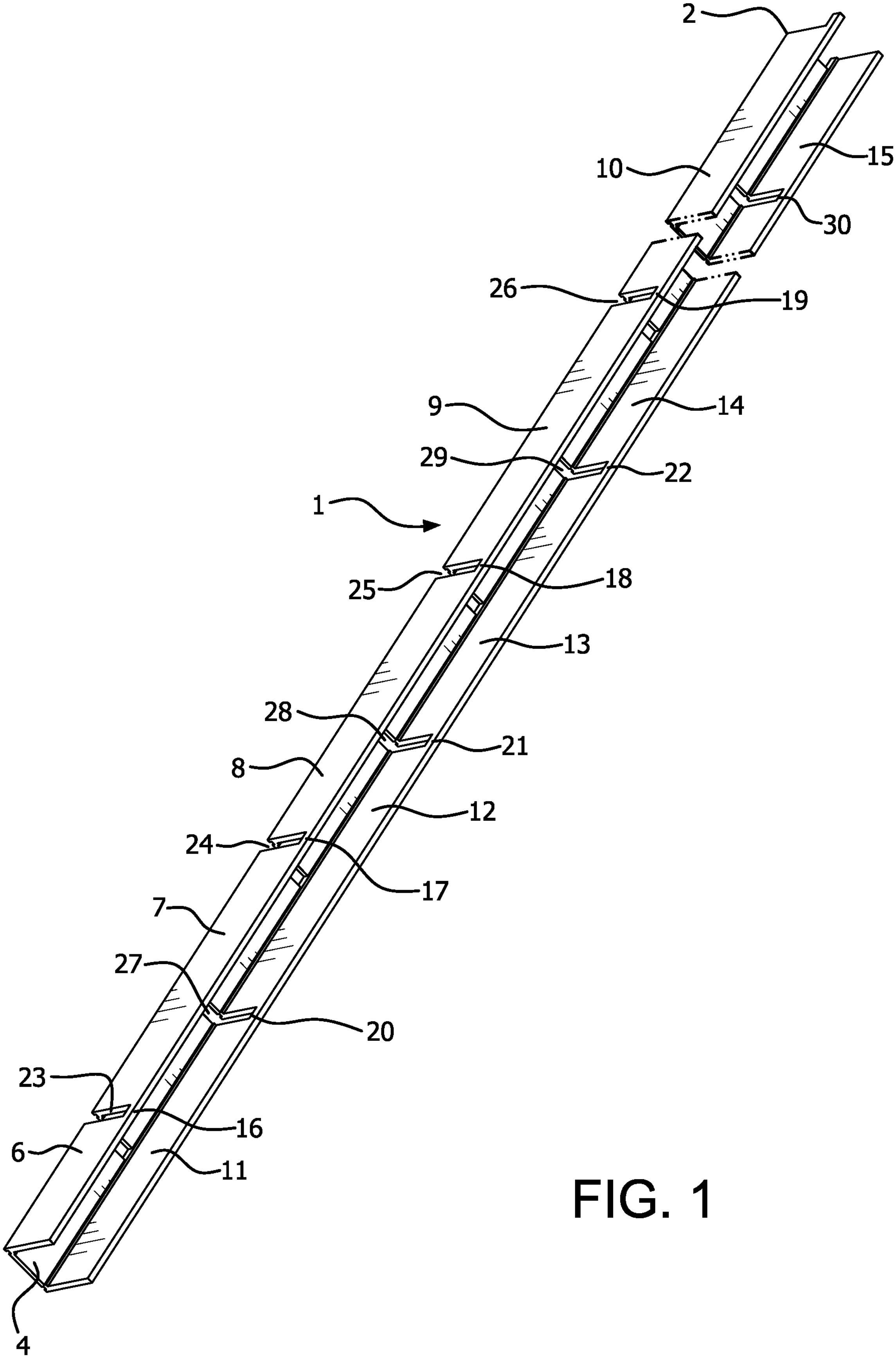
FIG. 1 is a perspective view of the lamp support of the present invention in its straight, unbent configuration.
Figure 2:
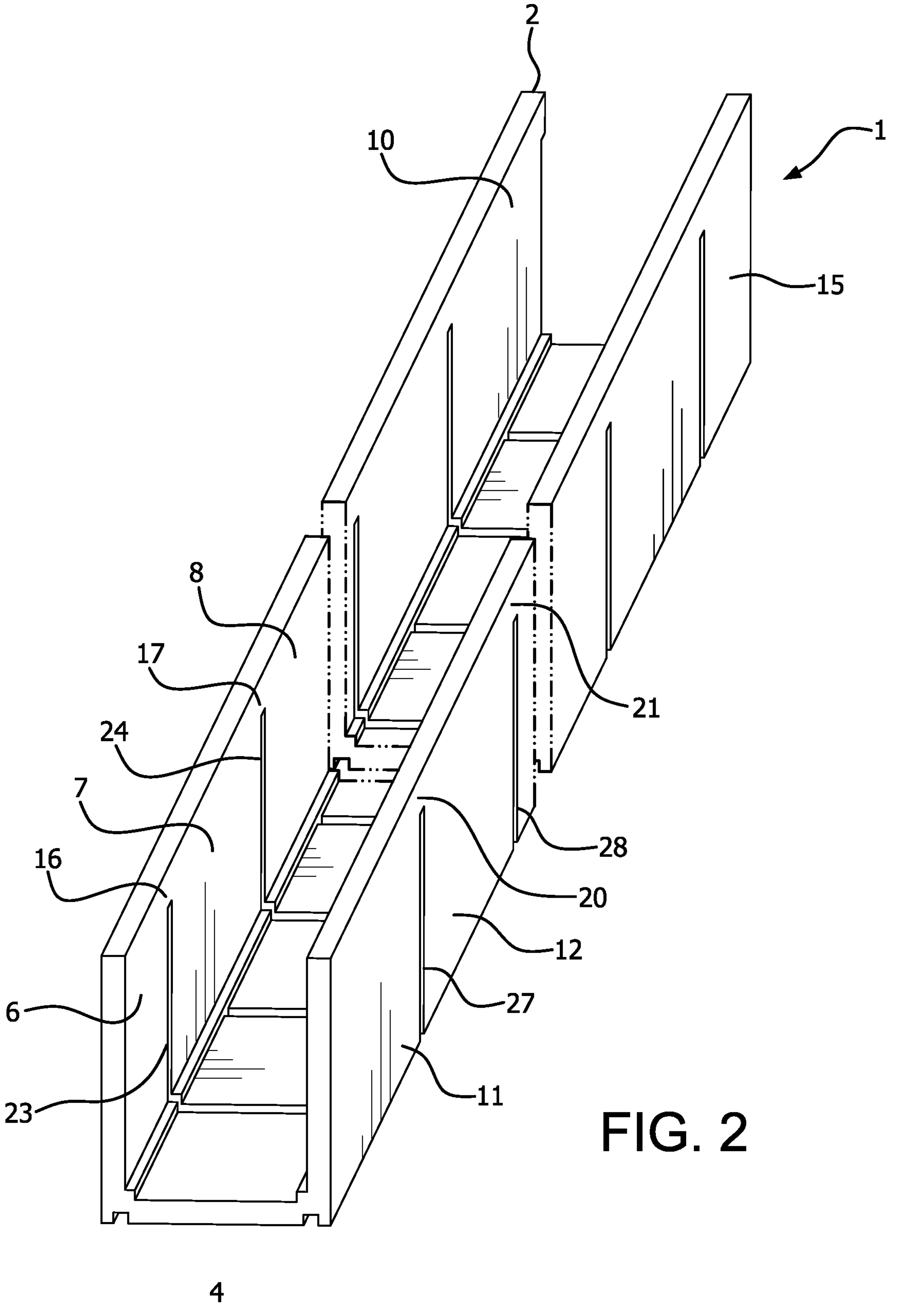
FIG. 2 is a close-up, detailed end view of the lamp support of the present invention shown in FIG. 1.

Lamp support 1 in its straight configuration, as seen in FIG. 1, is an elongated, malleable metal, preferably aluminum, channel 2. Channel 2 comprises bottom member 4 which extends the length of the channel. A first plurality of adjacently aligned side wall members 6, 7, 8, 9, and 10 extends perpendicularly upward from a first side of bottom member 4 and a second plurality of adjacently aligned side wall members 11, 12, 13, 14, and 15 extends perpendicularly upward from a second and opposite side of the bottom member. All side wall members extend the length of channel 2. As best seen in FIGS. 1 and 2, bridge sections 16, 17, 18, 19, 20, 21, and 22 interconnect their respective adjacently aligned side wall members 6/7, 7/8, 8/9, 9/10, 11/12, 12/13, 13/14, and 14/15. Slotted openings 23, 24, 25, 26, 27, 28, 29 and 30 are located between side walls 6/7, 7/8, 8/9, 9/10, 11/12, 12/13, 13/14, and 14/15 respectively. Each slotted opening extends from and through bottom member 4 up to bridge sections 16-22. The first plurality of slotted openings and the second plurality of slots are staggered in relation to each other, along channel 2.

Figure 3:
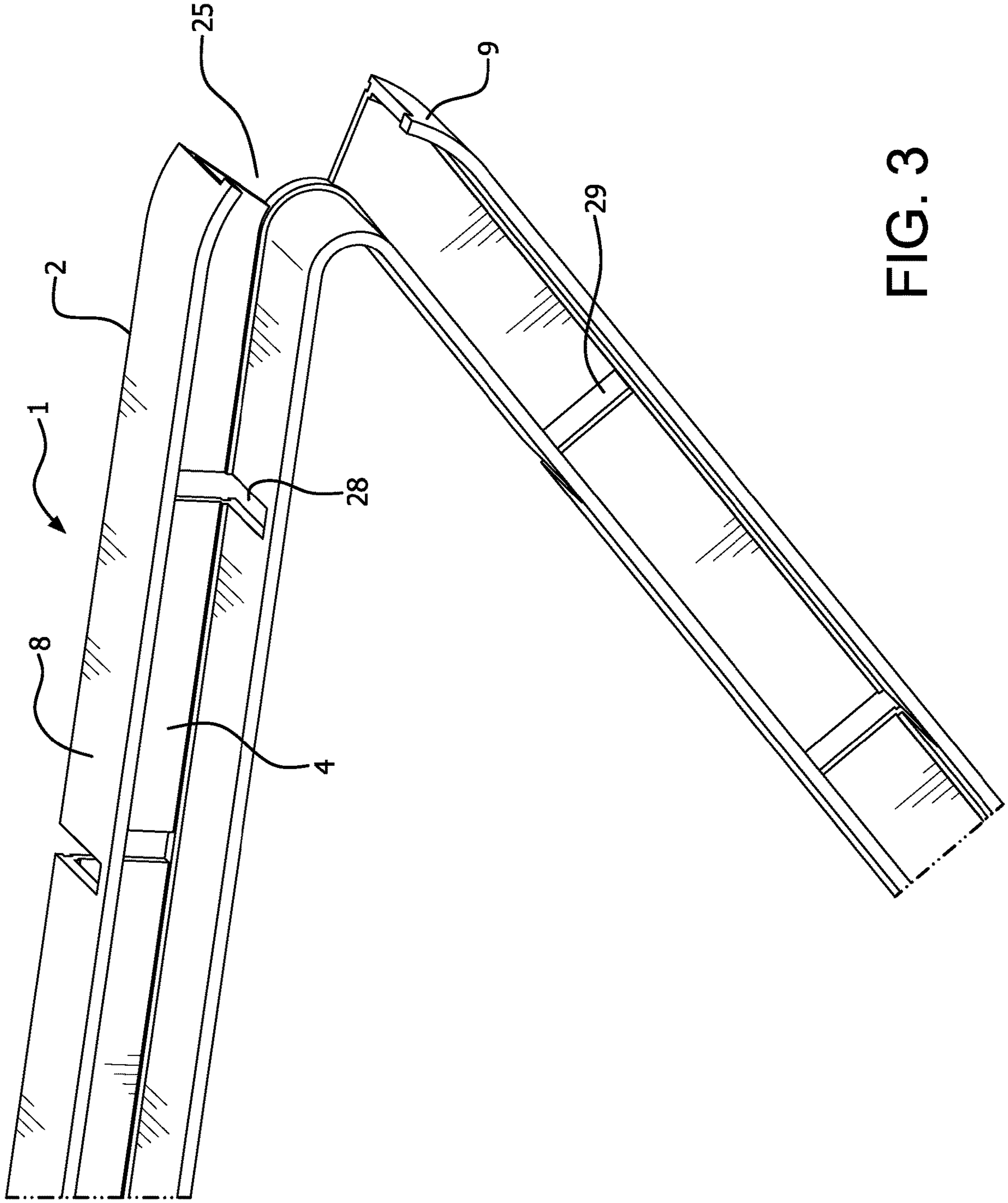
FIG. 3 is a close-up, detailed view of a bended section of the lamp support of the present invention, following the severing of a bridge section.

Although the metal which forms channel 2 is somewhat malleable, if attempts are made to bend channel 2, as it is seen in FIG. 1, the channel will crack, break, or its structural integrity will otherwise fail. However, as illustrated in FIG. 3, by severing bridge section 18, which connects side wall members 8 and 9, channel 2 can be bent at slotted opening 25 between moderately arched side wall 8 and 9, with no damage to the channel's structural integrity.

Figure 4:
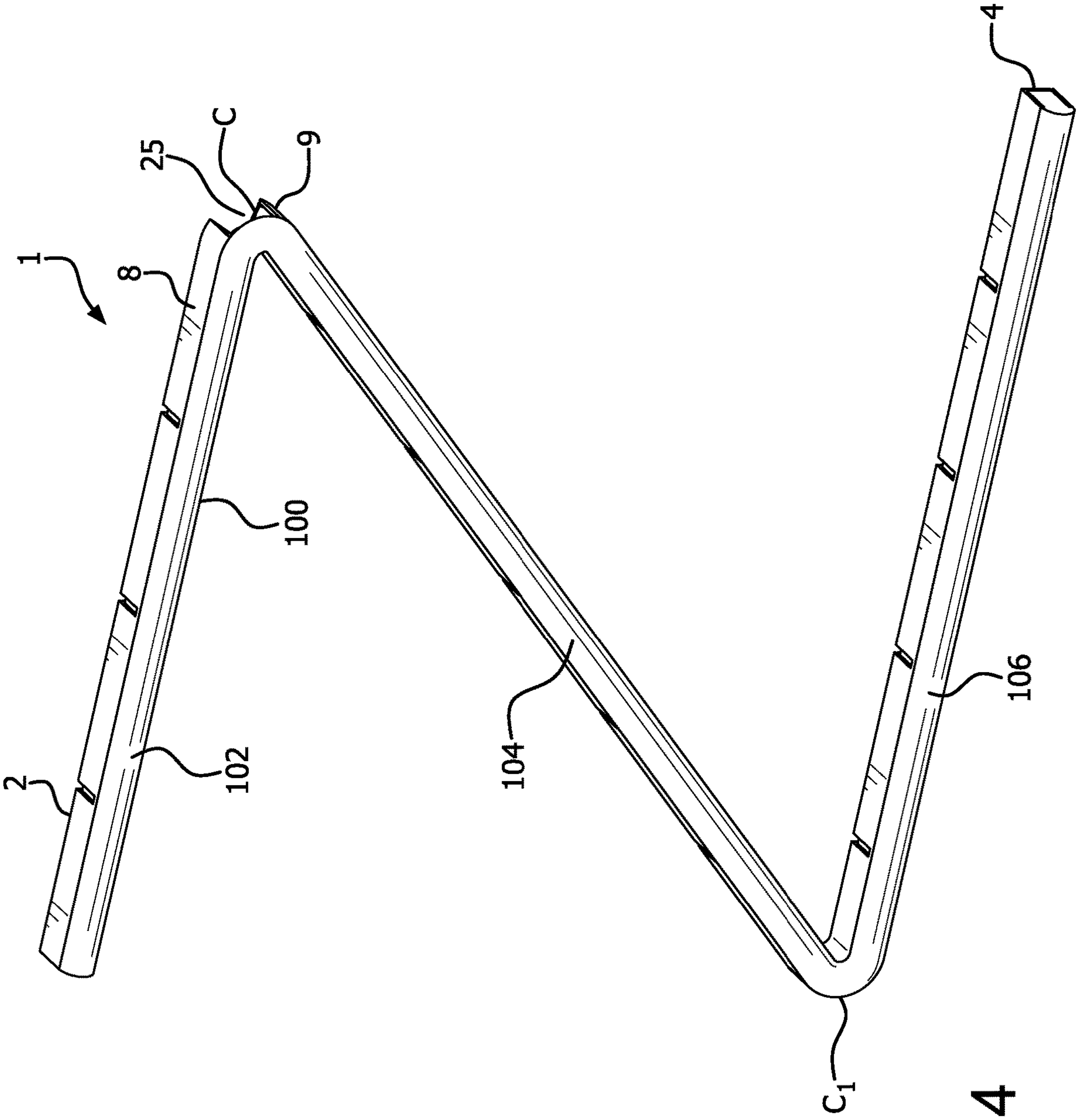
FIG. 4 illustrates the use of the lamp support of the present invention in conjunction with an LED neon lamp.

FIG. 4 provides an example of the flexibility of channel 2 of lamp support 1 and how it is used to support and shape an LED neon lamp. Elongated, bendable neon lamp 100 is mounted within channel 2, such that the lamp bends along with the channel at slotted opening 25 resulting in bended corner C, and at another slotted opening (not shown) at the end of straight section 104, bended corner C1. Lamp 100 is configured such that sections 102, 104, and 106 of the lamp remain straight, along with the straight sections of channel 2.

Figure 5:
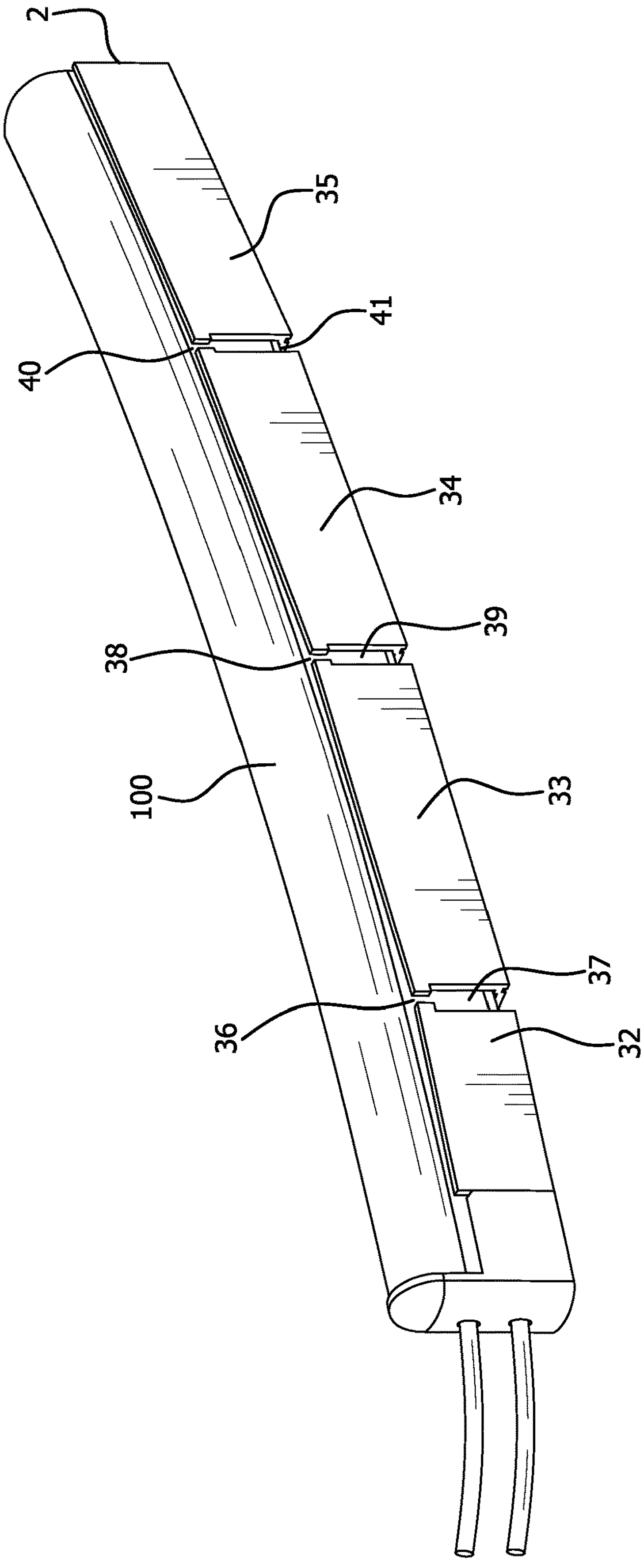
FIG. 5 illustrates another use and configuration of the lamp support of the present invention in conjunction with an LED neon lamp.

FIG. 5 illustrates how lamp support 1 of the present invention can be used to create an alternate curved design. Lamp 100 is housed within wall members 32, 33, 34, and 35 and the opposite side wall members (not shown) of channel 2. The interconnective bridge sections between wall members 32 and 33 have been severed at 36 above slotted opening 37; between wall members 33 and 34 at 38 above slotted opening 39; and between wall members 34 and 35 at 40 above slotted opening 41. This allows channel 2 to be bent with its structural integrity in tact, at slotted openings 37, 39, and 41 and with wall members 32, 33, 34 and 35 being only moderately arched.

It is therefore evident that lamp support 1 of the present invention provides a novel and versatile means to support a LED neon lamp, allowing for the lamp to be formed into a myriad of desired configurations simply by severing the appropriate bridge sections and bending channel 2 along with its accompanying lamp, at the corresponding slotted openings. The structural integrity of channel 2 will continue to remain intact while the LED neon lamp configuration is retained.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A support for an elongated bendable, LED neon lamp, said support comprising:

a straight, elongated, malleable metal channel having a bottom member extending the length of the channel, a plurality of adjacently aligned side wall members extending upward from the bottom member and a slotted opening located between each of the adjacently aligned side wall members, each of the side wall members being interconnected by a bridge section located above each of the slotted openings, the bridge sections extending between adjacent side wall members; wherein when at least one of the bridge sections are severed, the channel is configured to bend at at least one of the slotted openings with the channel maintaining its structural integrity, and wherein when an elongated, bendable LED neon lamp is mounted within the channel, the lamp bends along with the channel at the at least one of the slotted openings.

2. The support as in claim 1 wherein the plurality of adjacently aligned side wall members extends upward from a first side of the bottom member.

3. The support as in claim 2 further comprising a second plurality of adjacently aligned side wall members extending upward from a second and opposite side of the bottom member and a slotted opening located between each of the adjacently aligned second plurality of side wall members, each of said side wall members being interconnected by a bridge section located above each of the slotted openings, the bridge sections extending between adjacent side wall members.

4. The support as in claim 3 wherein the plurality of slotted openings and the second plurality of slotted openings are staggered in relation to each other along the length of the channel.

5. The support as in claim 1 wherein the metal channel is aluminum.

6. The method of supporting an LED neon lamp, the steps of the method comprising:

providing a straight, elongated metal channel having a bottom member extending the length of the channel, a plurality of adjacently aligned side wall members extending upward from the bottom member, and a slotted opening located between each of the adjacently aligned side wall members, each of the side wall members being interconnected by a bridge section located above each of the slotted openings, the bridge sections extending between adjacent side wall members;

severing at least one of the bridge sections located above its slotted opening;

bending the channel at said slotted opening while maintaining the structural integrity of the channel; and placing a bendable LED neon lamp within the bent channel so that the lamp takes and retains the same shape as the bent channel.

7. The method as in claim 6 comprising the further step of severing a second bridge section located above its slotted opening and bending the channel at said slotted opening while maintaining the structural integrity of the channel.

* * * * *